United States Patent Office 3,822,206
Patented July 2, 1974

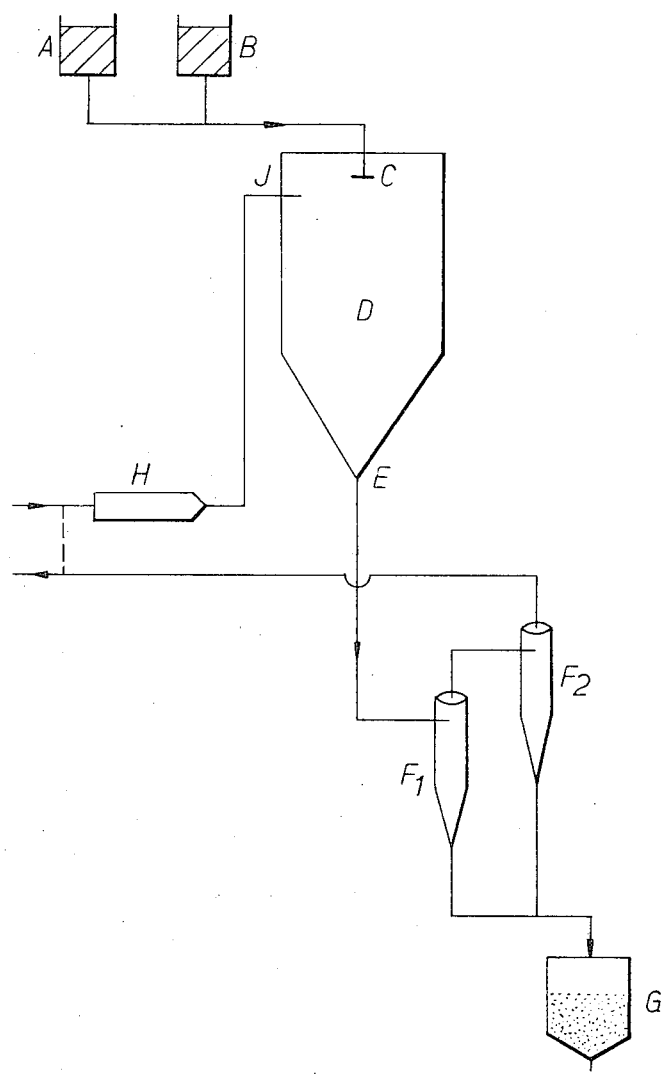

3,822,206
PREPARATION OF SOLID FIRE-FIGHTING
COMPOSITIONS
David Curran, Runcorn, England, assignor to Imperial
Chemical Industries Limited, London, England
Filed Nov. 13, 1972, Ser. No. 305,656
Claims priority, application Great Britain, Dec. 7, 1971,
56,742/71
Int. Cl. A62d 1/00
U.S. Cl. 252—2                                    14 Claims

ABSTRACT OF THE DISCLOSURE

A solid fire-extinguishant composition is prepared by reacting urea and a carbonic salt of sodium or potassium wherein the reaction mixture is in the form of a solution or slurry in a liquid which is a solvent for at least one of the reactants. The solution or slurry is then evaporated. The active component of the extinguishant which is prepared has the empirical formula $MC_2N_2H_3O_3$ wherein M is sodium or potassium.

---

This invention relates to the production of solid compositions for use as dry powder fire-extinguishants.

In U.K. Patent Specification No. 1,168,092 fire-fighting compositions are described which are made by heating urea with carbonic salts of alkali-metals. The solid state reaction involved tends to be a slow reaction and the process described therein takes several hours to complete. We have now found an improved process in which the solvent action of a liquid is employed to bring the reactants together. Thus according to the present invention there is provided a process for the preparation of solid compositions suitable as fire-extinguishants wherein urea and a carbonic salt of sodium or potassium are reacted together, comprising also the steps of contacting the reactants in the presence of a liquid having appreciable solvent action on at least one reactant and subsequently removing the liquid by evaporation.

The carbonic salt may be a carbonate, bicarbonate, sesquicarbonate or mixtures thereof or it may be formed in situ from the combination of a hydroxide of sodium or potassium with carbon dioxide.

The extent of the solvent action of the liquid medium may be quite small; for example, a solvent action which will form a solution containing as little as 1% by weight of one reactant is effective for the process. However a greater solvent action is preferable, for example sufficient to provide a solution containing at least 10% by weight of a reactant. The process may be conducted more economically the greater the solvent action because the smaller volume of liquid required to bring the reactants into contact is more readily evaporated.

The liquid may be an aqueous or non-aqueous liquid, and may be either a single liquid or a composition containing one or more liquids. The liquid may include alcohols (preferably methanol or ethanol), ether alcohols (for example Cellosolve), nitriles (preferably acetonitrile), amides (preferably dimethylformamide), sulphoxides and sulphones; the preferred examples being selected mainly because of their low boiling points. The liquid should, for better results, be one which is capable of dissolving a substantial proportion of one or both reactants but it is not necessary to effect complete solution of even one reactant. The solvent used may be effective as a solvent only at an elevated temperature, for example the urea may be molten at the temperature of the reaction and be miscible with a solvent in which crystalline urea does not readily dissolve. The preferred liquid is an aqueous composition and especially preferred is water itself. The liquid may be used in a variety of ways to bring together the reactants, for example a solution or slurry of one reactant may be added to another reactant or the liquid may be agitated with a mixture of the solid reactants in order to make solution or slurry. One preferred method is to completely dissolve one reactant, usually the urea which is extremely soluble in aqueous media.

The evaporation step is preferably carried out at a temperature above 100° C., the rate of the process being increased thereby; however, useful compositions may be made at lower evaporation temperatures for example temperatures in the range 40° C.–100° C., reduced pressure being used to aid the evaporation.

In a preferred form of the invention the solution or slurry of liquids and reactants is divided into discrete drops prior to the evaporation step. Thus, for example, the solution of slurry may be dropped on to a heated band, belt or tray and the solid product formed after evaporation scraped off and collected, the heated surface being thus re-prepared for fresh drops of the reactant mixture.

In an especially preferred form of the invention the solution or slurry of liquid reactants is divided into fine droplets by spraying. The spray may then be directed at a heated surface or more advantageously sprayed into a hot atmosphere. In the latter method, which may be termed "spray-drying," the droplets are kept apart during the evaporation step and the solid product is produced in a particulate form. Thus the spray-drying is a particularly preferred form of the invention for the production of a fine powder for fire-fighting purposes. An additional advantage of the spray-drying process is that the particle size and the distribution thereof may be controlled easily by adjustment of the conditions of operation of the spray-drying equipment.

In the spray-drying process it is convenient to produce heat for the evaporation and the heating of the dried particles by feeding a hot gas into the spray-chamber i.e. a gas heated to a temperature in excess of, preferably at least 100° C. in excess of, the temperature required for the chemical reaction to occur. It has been found that convenient temperatures are for example from 200° C. to 1000° C. preferably 300° C. to 600° C. for the inlet gas in order to transmit sufficient heat to the reactants.

The flow-rate of the materials through the spraying chamber is then adjusted so that the temperature of the gases at the outlet are from 40° C. to 300° C., preferably from 100° C. to 160° C. and especially from 125° C. to 150° C. These are close to the temperatures to which it is desirable to heat the reactants in order to produce good yields of product.

The hot gas may be composed of one or more of the gases found in air, air itself being the most convenient although any stable gas may be used. It is an advantage to have a higher concentration, e.g. a volume concentration of 1% to 10%, of carbon dioxide in the evaporation atmosphere because this promotes a high yield of the desired product of urea and the carbonic salt which is a compound of empirical formula $MC_2N_2H_3O_3$ as defined in UK Patent Specification No. 1,168,092.

The higher concentration of carbon dioxide may be produced conveniently by using air heated by a naked gas or oil-flame as the hot atmosphere into which the solution or slurry of reactants is sprayed. Clearly this method is to be preferred when an even higher concentration of carbon dioxide is required, for instance if hydroxide is employed to produce the carbonic salt reactant *in situ*.

It is also an advantage to have some water vapour, preferably from 10 to 30% by volume, in the evaporation atmosphere and although some of this may be produced by the process of evaporation of an aqueous liquid composition when this is used, extra water in the form of steam may be added if desired.

In order to effect one embodiment of the process of this invention the two reactants are mixed (preferably using a form of agitation) with water or an aqueous liquid so that substantially all of at least one of the reactants dissolves. It may be advantageous for subsequent spraying if both reactants dissolve but provided the particle size of any undissolved solid particles is not large compared with the droplet size, which may be for example 10–500$\mu$ diameter, a slurry containing one reactant in solution and the other in suspension is suitable for the process to be conducted effectively.

The aqueous liquid is preferably water but may also be an aqueous solution or suspension, optionally containing insoluble solids, for example solids which it is advantageous to incorporate into the final product e.g. finely divided silica as a flow additive. Mixtures of the product with active fire-extinguishing agents inert to the reactants e.g. potassium chloride, dicyandiamide or potassium sulphate or non-active solids e.g. sand, fluorspar, barium sulphate, gypsum or alumina may be made in this way and very intimate blends are obtained thereby. These are especially useful if the blend is of higher bulk-density than the original product, i.e. the added solid has a particle density greater than 1.8 g./cc. The aqueous liquid may contain one or more liquids, miscible in the form of a solution or immiscible in the form of an emulsion, the water being the major component. For example aqueous alcohol mixtures may be used, the lower alcohols being preferred for easy evaporation.

The reactants used for the process are urea and a carbonic salt as hereinbefore defined of sodium or potassium; potassium bicarbonate is preferred because the use of this salt leads to a product which is superior for firefighting applications. The proportions of the reactants may be substantially equimolar proportions of bicarbonate and urea, a small excess of bicarbonate being preferred for example up to 1.25:1. Conversely if the carbonates are used, an excess of urea is preferred for example from 1.5 to 3.5:1 molar proportions of urea to carbonate.

The total weight of the reactants added to the aqueous liquid is preferably as large as is consistent with maintaining a convenient mobility of the resultant solution or slurry. Convenient quantities are from 10% to 80% of reactants by weight relative to the weight of the solution or slurry. Thus for example preferred quantities may be from 10 g. of urea and 20 g. of potassium bicarbonate added to 100 g. of water up to higher concentrations which may be for example 50 g. of urea and 100 g. of potassium bicarbonate added to 100 g. of water. The aqueous mixture of reactants is normally prepared at room temperature but the mixture may be heated prior to evaporation in order to dissolve the maximum quantity of reactants, care being taken when bicarbonates are involved that excessive heating is avoided.

A convenient and preferred means of carrying out the process when spray-drying is adopted, is illustrated in the figure which is a schematic drawing showing the arrangement of the various components of the apparatus used.

Solutions of slurries of the individual reactants are contained in each of the tanks A and B and they are mixed together and delivered to a spray-atomiser C in the spray-drying chamber D. Heated air, or other mixtures of gases from heater H is fed into the spray-dryer at J. The evaporated products are carried by the stream of hot gases to exit E and through the cyclone separators $F_1$ and $F_2$. The solids are separated from the gases and vapours the solids being collected in hopper G while the gases and vapours which emerge at K are either expelled to the atmosphere or recycled to the heater H.

Alternatively a mixture of the reactants may be contained in tank B either in the form of a dry powder or mixed with a liquid. The mixture of reactants is metered into a water stream from tank A in order to provide a suitable solution or slurry to pass into the spray-dryer.

The solid product collected after evaporation in certain forms of the invention, for example spray-drying processes, may, if the concentration of the urea is below 5% by weight and the particle size is suitable, be used without further treatment as a dry-powder fire-extinguishant. In other methods of carrying out the invention some treatment of the product is desirable for example either the grinding of the product to a mean particle size of between 10$\mu$–50$\mu$, preferably 20$\mu$–40$\mu$ or the extraction of free urea by means of a solvent-washing process. As an alternative to a solvent-washing process unreacted free urea and by-products, for example of carbonate and cyanate, may be substantially removed from the product by contact with heated air preferably air containing at least 5% carbon dioxide and at least 10% water vapour. The purification process may conveniently be carried out in a conventional apparatus for the production of a fluidised bed (either batchwise or continuously) and the solid product may be heated by the air or otherwise to a temperature in the range 30° C. to 250° C., preferably in the range 80° C. to 160° C. and especially in the range 90–140° C. The products of the present invention in all cases contain a major proportion of compound $MC_2N_2H_3O_3$ where M is Na or K which has been demonstrated to have a powerful flame-extinguishing effect and thus the products are useful as fire-extinguishing agents. The treatments hereinbefore referred to as desirable may be carried out to improve the storage qualities and subsequent flow characteristics of the powder after storage.

The invention may be illustrated but in no way limited by the following Examples:

Example 1

A mixture was prepared of potassium bicarbonate and urea in molar proportions of 1.15:1 and was dissolved in the minimum quantity of water. The solution was heated in a beaker over an oil-bath maintained at 130° C. until all the water had evaporated and the heating was continued for a further 10 minutes.

The product was analysed and found to contain

51% $KC_2N_2H_3O_3$
3.3% Free Urea
0.1% Potassium Cyanate the rest being a mixture of potassium bicarbonate and potassium carbonate.

Example 2

A solution of potassium bicarbonate and urea in molar proportions of 1.15:1 and containing a total of 30% by weight of solids, was placed in a burette mounted above a slowly-moving stainless steel band heated to a temperature of 150° C. The solution was dropped from the burette on to the bed, and the continuous movement of the band allowed each drop of solution falling from the burette to contact a fresh portion of the heated hand. The water evaporated quickly and a solid product was left on the band which was scraped to remove the product as soon as it was dry.

The product was analysed and found to contain

75% $KC_2N_2H_3O_3$
2.7% Urea
0.15% Potassium Cyanate

Example 3

A solution and a slurry of potassium bicarbonate and urea in water were prepared both having molar proportions respectively of 1.15:1. The solution contained concentrations of 18.1% by weight of bicarbonate and 9.5% by weight of urea while the slurry contained 32.0% of bicarbonate and 16.8% of urea.

The solution and the slurry were each separately spray-dried using a 6 ft. diameter spray-drier ("Niro" Production Minor sold by A/S Niro Atomiser, Copenhagen, Denmark) with electric heaters and having a disc atomiser.

Hot air was passed through the drier and the flow rates of the solution/slurry varied to produce inlet and outlet temperatures as shown in Table I. The residence time in the spray-drier was approximately 18 seconds.

The product was analysed and found to have the compositions shown in Table I.

Example 4

Solutions of potassium bicarbonate and urea at four different concentrations and proportions designated A, B, C and D were prepared and processed through a 2 ft. 6 inch spray-drier (Niro Portable Minor sold by A/S Niro) the residence time in the spray-drier being 7 seconds. The hot air passed into the drier was heated by direct contact with a gas flame, thus the heated air passed to the spray-drier was mixed with the combustion products of the flame and thus contained a higher proportion of carbon dioxide and water vapour than normal air. The yield of active fire-extinguishing material ($KC_2N_2H_3O_3$), the by-product potassium cyanate and free urea were determined by analysis and the values are given in Table II. The particle size distribution of the product was observed to be very narrow, 88% of the particles were found to be within 8 and 12 μm. in diameter and the largest particle formed was 15 μm. diameter.

The free urea and potassium carbonate are not desirable in the final product for use as a fire-extinguishing composition and they were reduced to an acceptable level by contact with air containing carbon dioxide and steam in a fluidised-bed apparatus. The various concentrations of carbon dioxide and steam, and also the temperature and residence time are given in Table III. From the chemical analysis of the products obtained it may be seen that the concentration of $KC_2N_2H_3O_3$ is raised above 70% in all cases (except one) and is usually above 80% after this fluidised-bed treatment. The free urea and potassium carbonate are both reduced to acceptable levels and no potassium cyanate is produced provided sufficient carbon dioxide and water are provided to react with the impurities and prevent decomposition of the active compound $KC_2N_2H_3O_3$.

TABLE III

| Sample number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Temperature of solids: | | | | | | | | | | | | | | |
| Inlet | | | | Heated quickly from room temp. in 2 mins. as a single batch | | | | | | | | | | 130 |
| Outlet | 130 | 130 | 105 | 138 | 138 | 130 | 134 | 110 | 120 | 115 | 95 | 95 | 120 | 134 |
| Composition of air: | | | | | | | | | | | | | | |
| Percent by vol. of $CO_2$ | 11 | 10 | 0 | 10 | 10 | 0 | 5 | 20 | 5 | 10 | 5 | 5 | 0 | 10 |
| Percent by vol. steam | 34 | 35 | 30 | 20 | 0 | 20 | 5 | 45 | 30 | 25 | 0 | 15 | 0 | 20 |
| Residence times (mins.) | 30 | 50 | 40 | 90 | 90 | 90 | 90 | 27 | 30 | 40 | 40 | 60 | 30 | 80 |
| Composition of product, percent by wt.: | | | | | | | | | | | | | | |
| $KC_2N_2H_3O_3$ | 77 | 75 | 78 | 80 | 84 | 84 | 85 | 58 | 85 | 83 | 82 | 84 | 89 | — |
| Urea | 0.3 | 0 | 0 | 0 | 0.1 | 0 | 0 | 0.3 | 0.1 | 0.2 | 3.9 | 1.1 | 0.1 | 0.1 |
| KCN | 0 | 0 | 0 | 0 | 0 | 0 | 0 | 0 | 0 | 0 | 1.2 | 0 | 0 | 0 |
| $K_2CO_3$ | — | — | 5.2 | — | — | — | — | 0.8 | 0.4 | 0.4 | 0.5 | 0.4 | 3.5 | — |

NOTES:
Sample 14 was conducted as a continuous process and therefore the solids were heated prior to entry into the fluidised bed.
(—) means that no analysis was performed.
(0) means "none detected" and implies a level of less than 0.01%.
Sample 8 only contained 52% $KC_2N_2H_3O_3$ at the start.

TABLE I

| | Solution | | | Slurry | | |
|---|---|---|---|---|---|---|
| Inlet temperature, °C | 310 | 310 | 325 | 325 | 320 | 230 |
| Outlet temperature, °C | 140 | 145 | 140 | 145 | 135 | 140 |
| Product analysis, percent weight: | | | | | | |
| $KC_2N_2H_3O_3$ | 70 | 77 | 70 | 79 | 73 | 77 |
| KCNO | | 0.5 | | 1.2 | 0.6 | 2.8 |
| Urea | 4.0 | 1.6 | 4.7 | 1.4 | 5.0 | 0.5 |

TABLE II

| Composition of solution* | B | C | A | A | D | B | B | A | A |
|---|---|---|---|---|---|---|---|---|---|
| Inlet temperature, °C | 305 | 310 | 360 | 255 | 300 | 300 | 350 | 350 | 375 |
| Outlet temperature, °C | 150 | 150 | 150 | 130 | 130 | 130 | 130 | 140 | 140 |
| Product analysis, percent weight: | | | | | | | | | |
| $KC_2N_2H_3O_3$ | 65.8 | 57.5 | 63.3 | 60.5 | 76.0 | 62.5 | 71.5 | 73.5 | 75.0 |
| KCNO | 0.1 | 0.1 | 0.1 | | 0.1 | 0.1 | 0.1 | 0.2 | 0.2 |
| Urea | 3.6 | 4.3 | 4.3 | 9.5 | 7.8 | 8.5 | 6.2 | 4.5 | 5.3 |

*Code reference to composition of solutions in water:

| | A | B | C | D |
|---|---|---|---|---|
| Bicarbonate/urea, molar ratio | 1.10 | 1.15 | 1.20 | 1.0 |
| Potassium bicarbonate, percent by weight | 18.10 | 18.10 | 18.20 | 18.0 |
| Urea, percent by weight | 9.7 | 9.5 | 9.1 | 10.0 |

Example 5

Products are made according to this invention were analysed and found to contain typically 55 to 70% $KC_2N_2H_3O_3$
2 to 10% free Urea
2 to 5% Potassium Carbonate

Example 6

A solution or slurry was prepared of urea and either potassium carbonate or potassium bicarbonate in water and sprayed into a hot gas stream in the same apparatus as used for Example 4. The total weight of the reactants in the solution or slurry was equal to the weight of water. The proportions of reactants, temperatures used and the analyses of the products are shown in Table IV.

In three cases (samples 4, 5 and 6) it may be observed that other salts besides the reactants were incorporated in the slurry which was spray-dried. The other salts appeared in the final product unchanged chemically. The free urea and potassium carbonate were observed to be present in some samples of product at a higher concentration than is desirable for a fire-fighting powder. However the active compound $KC_2N_2H_3O_3$ is present at a good yield and the impurities could be removed if desired by a purification in a fluidised bed as described in Example 5. It is usually necessary to grind the product to an acceptable particle size for example a mean of 20 to 40 μm. for use as a fire-fighting powder.

TABLE IV

| Sample number | 1 | 2 | 3 | 4 | 5 | 6 |
|---|---|---|---|---|---|---|
| Molar ratio of reactants: | | | | | | |
|   Potassium bicarbonate: urea | 1.15:1 | | | 1:1.1 | 1:1.1 | 1:1.1 |
|   Urea: potassium carbonate | | 2:1 | 3:1 | | | |
| Hot gas stream: | | | | | | |
|   Percent by volume of water vapour | 5 | 5 | 5 | 5 | 5 | 0 |
|   Temperature of inlet gas, °C | 380 | 380 | 380 | 380 | 380 | 320 |
|   Temperature of outlet gas, °C | 140 | 140 | 140 | 140 | 140 | 140 |
| Additive to solution/slurry before spraying | None | None | None | $BaSO_4$ | KCl | $K_2SO_4$ |
| Analysis of product, percent by weight: | | | | | | |
|   $KC_2N_2H_3O_3$ | 70 | 65 | 69 | 68 | 66 | 52 |
|   Free urea | 3.0 | 3.2 | 10.3 | 4.6 | 3.0 | 15 |
|   KCN | 0 | 0.1 | 0.1 | 0 | 0 | 0 |
|   $K_2CO_3$ | 2.4 | 13.3 | 5.0 | — | — | — |
|   Additive | | | | $BaSO_4$ 20 | KCl 20 | $K_2SO_4$ 20 |

NOTES:
(0) means none-detected i.e. <0.01%.
(—) means no analysis was performed.

Example 7

A solid mixture containing 1.2 moles of potassium bicarbonate and 1 mole of urea were agitated with methanol to give a slurry containing 20% by weight of total solids. The urea was observed to dissolve readily but the bicarbonate largely remained undissolved in the methanol. The slurry was atomised in a Niro Portable Minor Spray-Drier through which air heated to a temperature of 280° C. was passed at a rate sufficient to provide an outlet temperature of 80° C. The product obtained after evaporation of the methanol was heated for 20 minutes at a temperature of 130° C. in air containing 10% by volume of water vapour.

The final product was observed to contain 2% of free urea and about 50% of the active fire-extinguishant $KC_2N_2H_3O_3$, the rest being mainly potassium bicarbonate.

What is claimed is:

1. In a process for the preparation of a solid fire-extinguishant composition containing as active component a compound of empirical formula $MC_2N_2H_3O_3$ where M is sodium or potassium by reacting urea and a carbonic salt of sodium or potassium, the improvement comprising preparing the reaction mixture in the form of a solution or slurry in a liquid which is a solvent for at least one of the reactants and subjecting the solution or slurry to a reaction temperature such that the liquid is removed by evaporation.

2. A process as claimed in claim 1 wherein the liquid is a solvent for both reactants.

3. A process as claimed in claim 1 wherein the liquid is a solvent for the urea.

4. A process as claimed in claim 1 wherein the solvent is an aqueous solvent.

5. A process as claimed in claim 1 wherein the total weight of the reactants present is from 10% to 80% by weight of the weight of the solution or slurry of liquid and reactants prior to evaporation of the liquid therefrom.

6. A process as claimed in claim 1 wherein the molar ratio of urea to carbonate salt is from 1.5 to 3.5.

7. A process as claimed in claim 1 wherein the carbonic salt is a bicarbonate and the ratio of bicarbonate-to-urea is from substantial unity to 1.25.

8. A process as claimed in claim 1 wherein the solution or slurry of liquid and reactants is sprayed in a chamber wherein there is a flow of hot gas.

9. A process as claimed in claim 4 wherein the solvent is water.

10. A process as claimed in claim 5 wherein the evaporation of the liquid is carried out at a temperature of at least 100° C.

11. A process as claimed in claim 5 wherein at least 20% of the solution or slurry is the liquid thereof.

12. A process as claimed in claim 8 wherein the gas flows out of the chamber at a temperature within the range of 100° C. to 160° C.

13. A process as claimed in claim 8 wherein the gas in the chamber contains from 10% to 30% by volume of water vapor.

14. A process as claimed in claim 8 wherein the gas in the chamber contains from 1% to 10% by volume of carbon dioxide.

References Cited

UNITED STATES PATENTS

| | | | |
|---|---|---|---|
| 3,607,744 | 9/1971 | Cottrell | 252—2 |
| 3,536,620 | 10/1970 | Birchall | 252—2 X |
| 3,642,621 | 2/1972 | Hollows | 252—2 X |

MAYER WEINBLATT, Primary Examiner

U.S. Cl. X.R.

106—15 FP; 252—7; 260—553, 553 C